A. LINDAHL.
POTATO BUG DESTROYER.
APPLICATION FILED DEC. 21, 1908.
931,440.
Patented Aug. 17, 1909.
2 SHEETS—SHEET 1.
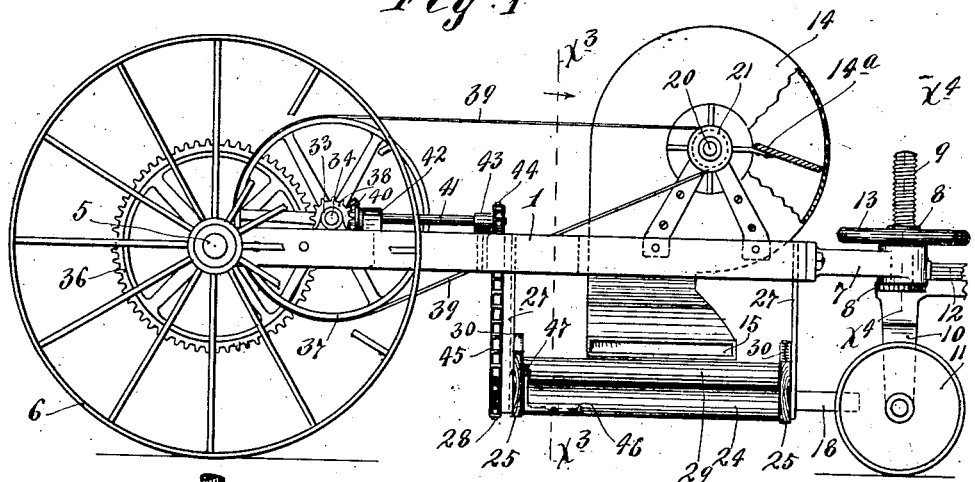
Witnesses
A. H. Opsahl.
R. P. Hicks.
Inventor.
August Lindahl
By his Attorneys
Williamson Merchant A. LINDAHL.
POTATO BUG DESTROYER.
APPLICATION FILED DEC. 21, 1908.
931,440.
Patented Aug. 17, 1909.
2 SHEETS—SHEET 2.
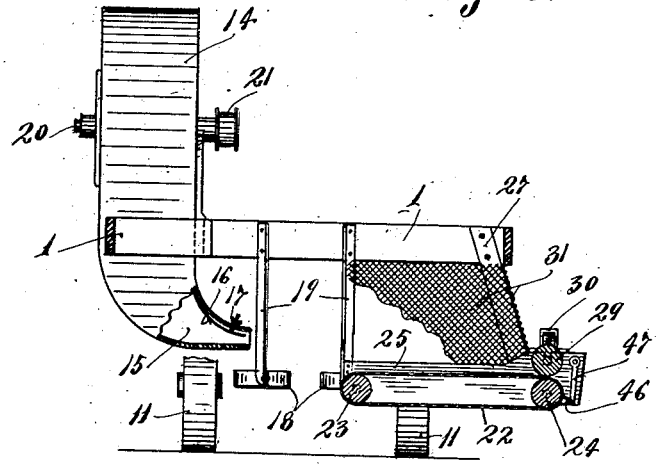
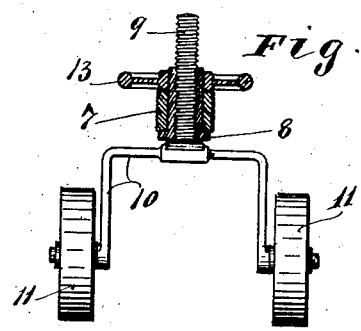
Witnesses.
A. H. Opsahl.
R. P. Hicks.
Inventor.
August Lindahl.
By his Attorneys
Williamson Merchant

UNITED STATES PATENT OFFICE.

AUGUST LINDAHL, OF GLYNDON, MINNESOTA.

POTATO-BUG DESTROYER.

No. 931,440.　　Specification of Letters Patent.　　Patented Aug. 17, 1909.

Application filed December 21, 1908. Serial No. 468,443.

*To all whom it may concern:*

Be it known that I, AUGUST LINDAHL, a citizen of the United States, residing at Glyndon, in the county of Clay and State of Minnesota, have invented certain new and useful Improvements in Potato-Bug Destroyers; and I do hereby declare the following to be a full, clear, and exact description of the invention, such as will enable others skilled in the art to which it appertains to make and use the same.

My invention has for its object to provide an improved machine adapted for use to collect and to destroy from potato vines and other vegetation potato bugs and destructive insects.

To the above ends the invention consists of the novel devices and combinations of devices hereinafter described and defined in the claims.

In the accompanying drawings, which illustrate the invention, like characters indicate like parts throughout the several views.

Referring to the drawings, Figure 1 is a view in side elevation, showing the improved machine, some parts being broken away; Fig. 2 is a plan view of the machine, some parts being broken away; Fig. 3 is a transverse vertical section taken on the line $x^3 x^3$ of Fig. 1; and Fig. 4 is a view, partly in elevation and partly in vertical section on the line $x^4 x^4$ of Fig. 1.

A skeleton metal frame, as shown, made up of a marginal bar 1 and a transverse bar 2, is rigidly bolted or otherwise secured at its rear portion to projecting arms 3 of bearings 4, in which latter a rear axle 5 is loosely journaled. On the ends of the axle 5 are rear traction wheels 6, preferably connected to said axle by one way pawl and ratchet devices not shown, but which will permit one of the said whels to move faster than the other in turning around.

To the central front portion of this frame is rigidly secured a heavy coupling bracket 7, the front end of which is pivoted on a flanged sleeve 8 which, in turn, works with threaded engagement on a strong upright threaded bolt 9 which in turn is rigidly secured at its lower end to a yoke like truck frame 10. The truck frame 10 is provided with a pair of loose truck wheels 11 and a pole 12 is rigidly secured to a centrally located forwardly projecting lug of the said frame 10. A suitable hand wheel 13 is rigidly secured to the upper end of the swiveled sleeve 8, so that by rotation of said sleeve, the forward end of the main truck frame 1—2 may be raised and lowered. Rigidly secured to one side of the forward portion of this main truck frame is a fan case 14 having a downwardly and inwardly turned discharge spout 15. In the discharge spout 15 is a damper or valve 16, which, by means of a nutted bolt 17, is adapted to be adjusted so as to vary the vertical dimension of the discharge passage of the said fan spout. It will be noted that the discharge passage of the fan spout is elongated horizontally in the direction of the traveling machine and is located slightly to one side of the transverse center of the machine. A pair of curved horizotally extended gathering bars 18 are secured at their end portions by four depending bars 19 shown as of angle iron, the front members being rigidly secured to the front portion of main frame bar 1 and the rear members being rigidly secured to the transverse member 2 of said main frame. The said gathering bars 18 are located quite close to the ground and slightly below the discharge passage of the fan spout 15.

Working within the fan case 14 is a rotating fan head 14ª, the shaft 20 of which at one end is provided with a driving pulley 21. The fan, as shown, is located on the lefthand side of the machine and, hence, at the righthand side of the machine there is a horizontally disposed transversely movable endless carrier belt or apron 22 arranged to run over rollers 23 and 24, which rollers are journaled in suitable supporting plates 25 rigidly supported from the main truck frame, as shown, partly by one of the depending bars 19 and by other depending bars 26 and 27, the former of which is secured to one of the gathering bars 18 and the two latter of which are secured to the frame bar 1. The inner roller 23 has a projecting shaft to the rear end of which a sprocket 28 is secured. A downwardly spring-pressed crushing roller 29 is mounted in suitable bearings 30 on the supporting plates 25 and engages the belt 22 immediately over the outer roller 24. A reticulate hood 31 is secured to the bars 26 and 27 and to one of the bars 19, immediately over the carrier belt 22, but is open at its inner side. To the righthand gathering bar 18, an upwardly and outwardly inclined blade 32 is secured. By a reference to Fig.

2 it will be noted that the gathering bars 18 flare in directions both forwardly and rearwardly from their central portions.

Mounted in suitable bearings 33, on the forwardly projecting arms 3 of the axle bearings 4, is a counter shaft 34 provided with a spur pinion 35 that meshes with a spur gear 36 carried by the axle 5. The counter shaft 34 carries a large pulley 37 and a beveled pinion 38. A belt 39 runs over the pulley 37 of the counter shaft 34 an over the small pulley 21 of the fan shaft so as to impart rotary motion at a high speed to the fan head 19, under advance movement of the machine. The beveled pinion 38 meshes with a beveled gear 40 of a counter shaft 41 that is mounted in a bearing 42 on the right-hand arm 3 and in a bearing 43 of the frame bar 2. At its forwardly projecting end the counter shaft 41 is provided with a sprocket 44. A sprocket chain 45 runs over the sprocket 44 and over the sprocket 28 of the roller 23 so as to impart traveling movement to the said apron 22, in the direction of the arrow marked thereon in Fig. 2, under advance movement of the machine. A pivoted gravity suspended scraper blade 46 engages the outermost portion of the apron 22, the same, as shown, having upwardly extended arms 47 pivotally connected at their upper ends to the outer ends of the supporting plates 25.

The operation of the machine is substantially as follows: When the machine is properly driven with its wheels straddling a row of potato vines, said potato vines will be gathered up by diverging front ends of the gathering bars 18 and will be supported thereby and the strong blast from the fan discharged therethrough. Under the action of this strong blast the bugs will be blown off the vines on to the endless belt or apron 22 and with the latter will be carried outward and under the crushing roller 29. The crushing roller, when set under the desired spring tension, will crush and kill the bugs and crushed bugs will be removed from the apron by the scraper 46. The reticulate hood or screen 31 serves to catch the bugs as they are blown from the vines and to direct the same on to the traveling apron 22 while permitting the blast to pass freely onward through the said screen or hood. The amount of air discharged from the fan may be regulated by adjustments of the damper or valve 16 in the discharge spout 15. After the vines have been subjected to the blast from the fan, they pass, under forward movement of the machine, out from between the diverging rear ends of the gathering bars 18.

By adjustments of the swiveled nut acting sleeve 8 the gathering bars 18 and the discharge spout of the fan and also the coöperating parts of the machine, may be raised and lowered for proper action on either large or small vines.

The machine while primarily designed for removing potato bugs from potato vines may nevertheless be used for a great many other purposes where it is desired to move destructive insects from vegetation.

What I claim is:

1. In a machine of the kind described, the combination with a truck having forwardly diverging gathering bars with a channel between them, of an approximately horizontal endless apron and coöperating supporting rollers located at one side of said gathering bars, a crushing roller coöperating with one of said apron supporting rollers, a fan located at the other side of said gathering bars and having a discharge spout arranged to blow a blast of air over the upper surface of said endless apron, and means for driving said apron and fan under the forward movement of the machine, substantially as described.

2. In a machine of the kind described, the combination with a truck having forwardly diverging gathering bars with a channel between them, of an approximately horizontal endless apron and coöperating supporting rollers located at one side of said gathering bars, a crushing roller coöperating with one of said apron supporting rollers, a fan located at the other side of said gathering bars and having a discharge spout arranged to blow a blast of air over the upper surface of said endless apron, means for driving said apron and fan under the forward movement of the machine, and a reticulate hood located above said apron and open at that side which is toward the gathering bars, substantially as described.

In testimony whereof I affix my signature in presence of two witnesses.

AUGUST LINDAHL.

Witnesses:
 ALICE J. SWANSON,
 HARRY D. KILGORE.